(12) United States Patent
Cheng et al.

(10) Patent No.: US 8,892,975 B2
(45) Date of Patent: *Nov. 18, 2014

(54) OPTIMAL ERROR PROTECTION CODING FOR MIMO ACK/NACK/PRE/POST INFORMATION

(75) Inventors: Jung-fu Thomas Cheng, Cary, NC (US); Bo Göransson, Sollentuna (SE); Stefan Parkvall, Stockholm (SE); Yi-Pin Eric Wang, Cary, NC (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 317 days.

This patent is subject to a terminal disclaimer.

(21) Appl. No.: 13/443,039

(22) Filed: Apr. 10, 2012

(65) Prior Publication Data

US 2012/0198299 A1    Aug. 2, 2012

Related U.S. Application Data

(63) Continuation of application No. 11/905,173, filed on Sep. 27, 2007, now Pat. No. 8,176,376.

(60) Provisional application No. 60/827,806, filed on Oct. 2, 2006, provisional application No. 60/863,036, filed on Oct. 26, 2006.

(51) Int. Cl.
*H04L 1/18* (2006.01)
*H03M 13/00* (2006.01)
*H04L 1/00* (2006.01)
*H04L 1/16* (2006.01)
*H04L 1/12* (2006.01)

(52) U.S. Cl.
CPC .............. *H04L 1/1607* (2013.01); *H04L 1/004* (2013.01); *H04L 1/0073* (2013.01); *H04L 1/1812* (2013.01); *H04L 2001/125* (2013.01)

USPC ........................................... 714/748; 714/781

(58) Field of Classification Search
CPC . H04L 1/004; H04L 1/0073; H04L 2001/125; H04L 1/1812; H04L 1/1607
USPC .................................. 714/748, 749, 751, 781
See application file for complete search history.

(56) References Cited

U.S. PATENT DOCUMENTS 3,818,442 A   6/1974  Solomon
4,541,095 A   9/1985  Vries
(Continued)

FOREIGN PATENT DOCUMENTS

EP    0166607    1/1986
EP    1819088    8/2007
FR    2873878    2/1906

OTHER PUBLICATIONS

3GPP TS 25.212 V5.10.0 (Jun. 2005) Technical Specification $3^{rd}$ Generation Partnership Project; Technical Specification Group Radio Access Network; Multiplexing and channel coding (FDD) Release 5.
(Continued)

*Primary Examiner* — Cynthia Britt
(74) *Attorney, Agent, or Firm* — Baker Botts, L.L.P.

(57) ABSTRACT

Error protection based on a nonlinear code set may be used in a multiple input multiple output (MIMO) radio communications system. A decoder decodes received MIMO data streams and generates an automatic repeat request (ARQ) message for data units received for the MIMO data streams for each transmission time interval. An encoder codes the ARQ message using a code word from a nonlinear code set. At the data transmitter, which transmits one or more data units in transmission time intervals from two or more MIMO data streams, the ARQ message associated with the transmitted data units is decoded using a code word from the nonlinear code set.

20 Claims, 6 Drawing Sheets

(56) References Cited

U.S. PATENT DOCUMENTS

| | | | |
|---|---|---|---|
| 7,116,651 | B2 | 10/2006 | Hakkinen et al. |
| 7,287,206 | B2 | 10/2007 | Terry et al. |
| 7,551,589 | B2 | 6/2009 | Kim et al. |
| 7,673,225 | B2 | 3/2010 | Jeong et al. |
| 8,176,376 | B2 * | 5/2012 | Cheng et al. .......... 714/748 |
| 2003/0126545 | A1 | 7/2003 | Tan |
| 2004/0219883 | A1 | 11/2004 | Pauli et al. |
| 2005/0219999 | A1 | 10/2005 | Kim et al. |
| 2006/0073790 | A1 | 4/2006 | Kent et al. |
| 2006/0203708 | A1 | 9/2006 | Sampath et al. |

OTHER PUBLICATIONS

3GPP TSG-RAN WG1, MIMO R7, Teleconference, Sep. 2006, "ACK/NACK coding".

3GPP TSG RAN WG1#29, Nov. 2002, "Scheme for meeting HS-DPCCH performance requirements for Rel-5".

TSG-RAN WG1 #46bis, Oct. 2006, "Coding for ACK/NACK in MIMO operation".

3GPP TSG RAN WG1 Meeting #47, Nov. 2006, "ACK/NACK coding for Rel-7 MIMO" Source: Philips, Ericsson.

3GPP TSG RAN WG1 Meeting #47, Nov. 2006, "ACK/NACK coding for Rel-7 MIMO" Source: Philips.

TSG-RAN WG1 #47, Nov. 2006, "Coding for ACK/NACK/PRE/POST in MIMO operation".

F.J. MacWilliams et al, "The Theory of Error-Correcting Codes" vol. 16, p. 674.

Notification of Transmittal of the International Search Report and the Written Opinion of the International Searching Authority issued in PCT/SE2007/050691 dated Feb. 26, 2008.

Office Action mailed Sep. 26, 2011 in co-pending U.S. Appl. No. 11/905,173.

Xi Zhang et al., "Adaptive Low-Complexity Erasure-correcting Code-Based Protocols for QoS-Driven Mobile Multicast Services Over Wireless Networks", Vehicular Technology, IEEE Transactions on , vol. 55, No. 5, pp. 1633-1647, Sep. 2006.

A. Agustin, et al., "Evaluation of turbo H-ARQ schemes for cooperative MIMO transmission", Wireless Ad-Hoc Networks, 2004 International Workshop on , vol. , No. , pp. 20-24, May 31-Jun. 3, 2004. doi: 10.1109/IWWAN.2004.1525535.

R. Nagareda, et al., "OFDM mobile packet transmission system with multiuser detection and metric combining ARQ", Vehicular Technology Conference, 2004. VTC2004-Fall. 2004 IEEE $60^{th}$, vol. 1, No., pp. 709-713, vol. 1, Sep. 26-29, 2004. doi: 10.1109/VETECF.2004.1400100.

* cited by examiner

BACKGROUND

BACKGROUND

BACKGROUND

BACKGROUND

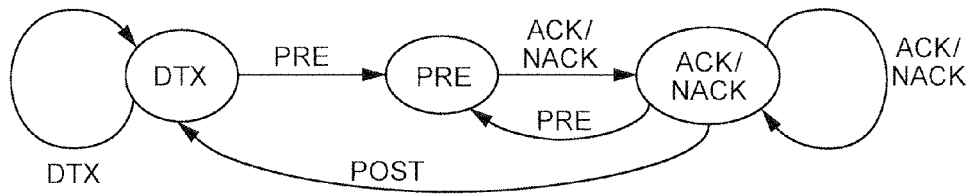
Figure 5 State diagram for extended ACK/NACK signaling.
BACKGROUND
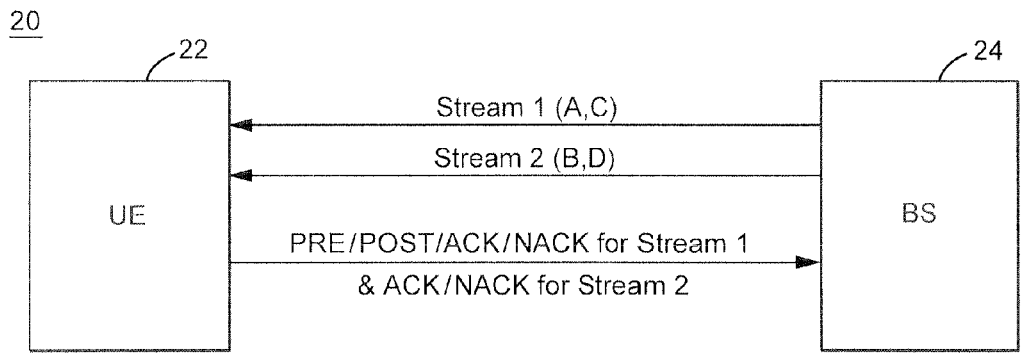
Figure 6
BACKGROUND
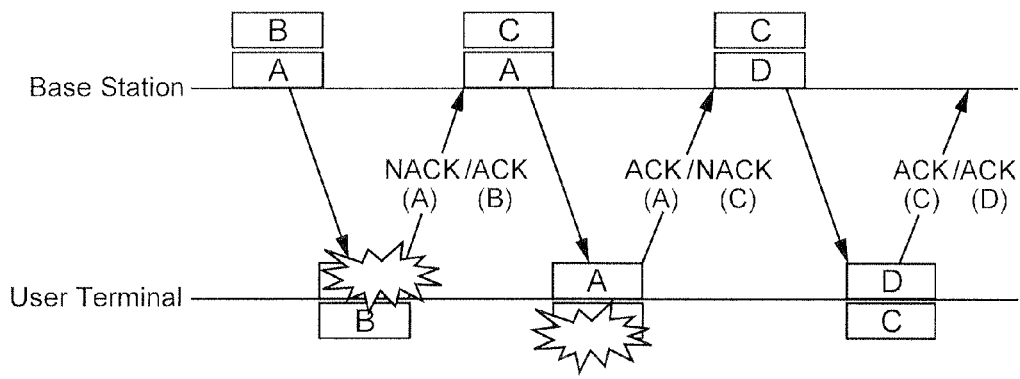
Figure 7
BACKGROUND Originally Transmitted Codeword A chosen Wrong Codeword B chosen

OPTIMAL ERROR PROTECTION CODING FOR MIMO ACK/NACK/PRE/POST INFORMATION

RELATED APPLICATIONS

This application is a continuation of U.S. application Ser. No. 11/905,173, filed Sep. 27, 2012, which claims priority from two U.S. provisional applications: 60/827,806, filed on Oct. 2, 2006, and 60/863,036, filed on Oct. 26, 2006. The disclosures of each of these applications is incorporated herein by reference.

TECHNICAL FIELD

The technical field relates to data communications, and in particular, to coding messages for multiple input multiple output (MIMO) data packet communications.

BACKGROUND

The Automatic ReQuest (ARQ) protocol is the basic scheme used in data communications in which the receiving station requests retransmission of a data packet if an error occurs, i.e., it was received with errors that cannot be corrected or it was not received at all. The term "data packet" is used here in the general sense of any type of data unit. Referring to FIG. 1, a communications system 10 includes a transmitter 12 and receiver 14. The transmitter 12 sends one or more data packets to the receiver 14. The receiver 14 sends an acknowledgment (ACK) message to the transmitter 12 to indicate that it has correctly received a data packet. Alternatively, the receiver 14 sends a negative acknowledgment (NACK) message to the transmitter 12 to indicate that it has not received a data packet in time or not correctly received a data packet.

FIG. 2 illustrates the sequence of events. The transmitter 12 sends packet A to receiver 14 which detects some sort of error. So the receiver returns a NACK message. The transmitter 12 resends packet A, and because it is correctly received this second time, the receiver 14 sends an ACK message back. The next packet B can then be sent. Of course, there are more complicated ARQ schemes, such as hybrid ARQ (HARQ), which are based on this fundamental ARQ protocol. HARQ is used in radio communications to enable faster recovery from errors by storing corrupted packets in the receiving device rather than discarding them. Even if retransmitted packets have errors, a good packet can be derived from the combination of bad ones. HARQ is used, for example, in High Speed Downlink Packet Access (HSDPA), which is a 3G high-speed digital data service provided by cellular carriers to provide faster bit rates over the air interface. HSDPA is a major enhancement of Wideband Code Division Multiple Access (WCDMA) technology which adds additional channels and selectively applies different modulation and coding techniques.

FIG. 3 shows a simplified example of an HSDPA communication system 15 where a user equipment (UE) 17 (sometimes called a mobile radio terminal or station) receives data packets over the air from a base station 19 (sometimes called a Node B). The packets are transmitted downlink using a high-speed downlink shared channel (HS-DSCH). The base station uses a high-speed shared control channel (HS-SCCH) to send corresponding physical layer control information (e.g., UE identity and spreading code allocation and decoding information which also supports soft combining in case of retransmission). In the figure, the HS-SCCH is used to inform the UE 17 of the intended recipient of the data packet soon to be transmitted. In the uplink direction, the UE 17 uses a high-speed dedicated physical control channel (HS-DPCCH) to convey to the base station 19 ACK and NACK messages, preamble (PRE) and postamble (POST) messages, and feedback information on the quality of the downlink channel.

Communication over HSDPA channels occurs as frames of subframes provided during transmission time intervals (TTIs), i.e., one subframe is one TTI (e.g., 2 ms for HSDPA). One subframe on the HS-DSCH may be used to convey a data packet or other unit. To facilitate the UE's efficient decoding of a data packet in a subframe on HS-DSCH directed to that UE, the UE first receives an indication on the HS-SCCH that the packet is intended for it as well as information needed for demodulating allocated code channels. If the UE 17 determines based on the advance indicator on the HS-SCCH that the next packet is intended for UE 17, it sends a PRE message back to the base station 19 over the HS-DPCCH to acknowledge its readiness to receive and decode that data packet. After the data packet has been transmitted, which may take multiple TTIs, and the UE detects it has received the end of the packet, the UE 17 acknowledges that fact by sending a POST message back to the base station 19 over the HS-DPCCH.

FIG. 4 illustrates an example of the timing relationship between messages and packets sent on the HS-SCCH, HS-DSCH, and the HS-DPCCH. When the UE detects control information addressed to it in sub-frame N on the HS-SCCH, the UE transmits a preamble (PRE) in sub-frame N−1 on the HS-DPCCH. After decoding the HS-DSCH packet and transmitting the hybrid ARQ ACK/NACK in sub-frame N on the HS-DPCCH, the UE transmits a postamble (POST) in sub-frame N+1 on the HS-DPCCH (unless a packet is detected in sub-frame N+1 on the HS-DSCH, in which case an ACK/NACK is sent, or HS-SCCH control information is detected in subframe N+2, in which case PRE is sent). Accordingly, a series of TTIs containing ACK/NACK signals is typically preceded with a TTI containing the PRE signal. A series of TTIs containing ACK/NACK signals may be also succeeded by a TTI containing the POST signal.

To improve ACK/NACK/PRE/POST detection performance, a trellis structure may be employed by the ACK/NACK signaling channel (e.g., the HS-DPCCH) as shown in FIG. 5. For a data session, a UE of interest starts in a discontinuous transmission (DTX) state in which nothing is sent over the HS-DPCCH. As long as the HS-SCCH addresses other UEs, the UE of interest stays in the DTX state. If the HS-SCCH addresses the UE of interest, then the UE moves from the DTX state to the PRE state where a PRE message is sent over the HS-DPCCH. While in the PRE state in subframe N−1, the UE demodulates and decodes the HS-DSCH packet in subframe N and sends an ACK or NACK message over the HS-DPCCH in subframe N, depending on whether HS-DSCH is correctly received. After sending an ACK or NACK over the HS-DPCCH, the UE transitions from the PRE state to the ACK/NACK state where it can continue to receive data on the HS-DSCH in subframe N+1. In that case, the UE sends an ACK or NACK on the HS-DPCCH and remains in the ACK/NACK state. Alternatively, if there is no more data on the HS-DSCH in subframe N+1, or information on the HS-SCCH in subframe N+2 is addressed to another UE, the UE sends a POST message on the HS-DPCCH during subframe N+1 and transitions back to the DTX state. If there is no more data on the HS-DSCH for the UE in subframe N+1, but the HS-SCCH addresses the UE in subframe N+2, then that UE sends a PRE message on the HS-DPCCH during subframe N+1 and transitions back to the PRE state.

The ACK and NACK messages are important messages that need to be received reliably and correctly. Channel coding is one way to provide increased message reliability. Currently in Release 5 of HSDPA, the HARQ ACK and NACK messages are sent using repetition coding over 10 bits. In other words, a binary "1" is repeated ten times for an ACK message and a binary "0" is repeated ten times for a NACK message. The more repetition bits used to encode the message, the more reliably the receiver can accurately decode the received information and extract the message that was actually transmitted. A repetition code is a linear code in the sense that a codeword w can be represented by w=xG, where G is a so-called generator matrix for the linear code and x is the information bit (1 or 0). The generator matrix for the aforementioned repetition code is G=[1 1 1 1 1 1 1 1 1 1].

Such a 10 bit repetition coding scheme has been employed for the ACK/NACK messages to be transmitted as illustrated in the table below where the output is denoted $w_0, w_1, \ldots w_9$. The PRE and POST messages are transmitted using two other codewords, also shown in Table 1.

TABLE 1

| | HARQ-ACK message | | | | | | | | | |
|---|---|---|---|---|---|---|---|---|---|---|
| | $w_0$ | $w_1$ | $w_2$ | $w_3$ | $w_4$ | $w_5$ | $w_6$ | $w_7$ | $w_8$ | $w_9$ |
| ACK | 1 | 1 | 1 | 1 | 1 | 1 | 1 | 1 | 1 | 1 |
| NACK | 0 | 0 | 0 | 0 | 0 | 0 | 0 | 0 | 0 | 0 |
| PRE | 0 | 0 | 1 | 0 | 0 | 1 | 0 | 0 | 1 | 0 |
| POST | 0 | 1 | 0 | 0 | 1 | 0 | 0 | 1 | 0 | 0 |

Multiple Input/Multiple Output (MIMO) is being introduced into wireless communications to improve transmission rates and overall performance. MIMO means that multiple transmitting antennas and/or multiple receiver antennas are used. When two transmitting antennas and two or more receiving antennas are used, two simultaneous data streams can be sent, which doubles the data rate. Multiple receivers alone allow greater distances between wireless devices.

FIG. 6 shows an example of a communications system 20 that employs dual stream MIMO. The base station 24 transmits two data streams 1 and 2 to the UE 22. In the first transmission, the first data stream in this example includes data packet A and the second data stream includes data packet B. The HS-SCCH signaling informs the UE 22 that there are two data streams being transmitted by the base station 24 over the HS-DSCH addressed to that UE 22. The UE 22 sends ACK/NACK messages for each of the two streams using the HS-DPCCH.

MIMO increases the level of ACK/NACK signaling. As illustrated in FIG. 7, in a dual or two-stream transmission (with separate encoding of each stream), there are four possible values for ACK/NACK message groups or combinations. Continuing with the example from FIG. 6, the first and second data stream transmissions from the base station of packets A and B are received, but only packet B is received successfully. Thus, a NACK message is returned for packet A (from the $1^{st}$ stream) and an ACK message for packet B (from the $2^{nd}$ stream). In the next TTI, the base station sends packets A and C, but only packet A is received successfully. Thus, an ACK message is returned for packet A ($1^{st}$ stream) and a NACK message for packet C ($2^{nd}$ stream). In the next TTI, the base station sends packets D ($1^{st}$ stream) and C ($2^{nd}$ stream) which are both successfully received so that the UE sends two ACK messages. The fourth ACK/NACK group or combination (not illustrated) is both transmitted packets are not received successfully resulting in the UE sending two NACK messages.

To accommodate a two stream MIMO scheme in the ten bit ACK/NACK error protection encoding scheme in the current HSDPA, those ten bits can be used to carry one ACK/NACK message for each stream by simply repeating the ACK/NACK bits five times rather than ten, five "1's" for ACK and five "0's" for NACK. In this way, two ACK/NACKs can be fit into the ten bits available in the current HS-DPCCH. With this scheme the following codewords are mapped to the different ACK/NACK combinations.

ACK ($1^{st}$ stream) & ACK ($2^{nd}$ stream): 1 1 1 1 1 1 1 1 1 1
ACK ($1^{st}$ stream) & NACK ($2^{nd}$ stream): 1 1 1 1 1 0 0 0 0 0
NACK ($1^{st}$ stream) & ACK ($2^{nd}$ stream): 0 0 0 0 0 1 1 1 1 1
NACK ($1^{st}$ stream) & NACK ($2^{nd}$ stream): 0 0 0 0 0 0 0 0 0 0
This is a linear code, and thus, the codeword can be generated by a modulo-2 operation w=xG, where the generator matrix in this case is:

$$G = \begin{bmatrix} 1 & 1 & 1 & 1 & 1 & 0 & 0 & 0 & 0 & 0 \\ 0 & 0 & 0 & 0 & 0 & 1 & 1 & 1 & 1 & 1 \end{bmatrix}$$

and the information vector is x=[b(1) b(2)], and where b(1) is the ACK/NACK bit for the $1^{st}$ stream and b(2) is the ACK/NACK bit for the $2^{nd}$ stream. But a problem with this approach is that the error protection for ACK/NACK messages is considerably less than in the case of ten bit repetition coding. The result is either higher error rates, or a higher transmit power to keep the same error rate. Neither is an attractive solution. What is needed is a different coding scheme that provides the necessary error protection and optimizes the number of coding bits for multiple MIMO streams, e.g., two, three, four, etc.

SUMMARY

An error protection method and apparatus are disclosed for use in a multiple input multiple output (MIMO) radio communications system. One example radio communications system is a High Speed Downlink Packet Access (HSDPA) system in which the apparatus or method may be implemented in a mobile radio station or in radio base station. In one example embodiment, a radio receiver receives two or more MIMO data streams transmitted over a radio interface. A decoder decodes the received MIMO data streams and generates an automatic repeat request (ARQ) message for one or more data units received for each MIMO data stream for each transmission time interval. An encoder codes the ARQ message using a code word from a nonlinear code set.

In another example embodiment for use in a multiple input multiple output (MIMO) radio communications system, a transmitter transmits in transmission time intervals one or more data units for two or more MIMO data streams transmitted. A receiver receives an ARQ message associated with one or more data units received for each MIMO data stream for each transmission time interval. A decoder decodes the ARQ message using a code word from the nonlinear code set.

The ARQ message includes one or both of acknowledgment (ACK) and negative acknowledgement (NACK) signals. In a first example implementation, the ARQ message includes one of the following acknowledgment (ACK) and/or negative acknowledgement (NACK) pairs, with one ACK or NACK indicator per MIMO stream: ACK/ACK, ACK/NACK, NACK/ACK, and NACK/NACK. The nonlinear code set for a two MIMO stream system has a nonlinear code set property of $C_{10,4,6}$ such that there are ten bits per code word, four code words in the nonlinear code set, and a minimum code distance of six between each of the four code words from the remaining ones of the four code words.

In a second example implementation, the ARQ message includes one of the following acknowledgment (ACK) and/or negative acknowledgement (NACK) triplets, with one ACK or NACK indicator per MIMO stream: ACK/ACK/ACK, ACK/ACK/NACK, ACK/NACK/ACK, ACK/NACK/NACK, NACK/ACK/ACK, NACK/ACK/NACK, NACK/NACK/ACK, and NACK/NACK/NACK. The nonlinear code set for a three MIMO stream system has a nonlinear code set property of $C_{10,8,5}$ such that there are ten bits per code word, eight code words in the nonlinear code set, and a minimum code distance of five between each of the eight code words from the remaining ones of the eight code words.

In a third example implementation, the ARQ message includes one of sixteen different combinations of four ARQ messages having one or both of an acknowledgment (ACK) signal and a negative acknowledgement (NACK) signal, with one ACK or NACK indicator per MIMO stream. The nonlinear code set for a four MIMO stream system has a nonlinear code set property of $C_{10,16,4}$ such that there are ten bits per code word, sixteen code words in the nonlinear code set, and a minimum code distance of four between each of the sixteen code words from the remaining ones of the sixteen code words.

In a fourth example implementation, the ARQ message transmitted in a TTI includes one of four different combinations of acknowledgment (ACK) and/or negative acknowledgement (NACK) signals plus a preamble (PRE) and a postamble (POST). One or typically a series of TTIs containing ACK/NACK signals is preceded with a TTI containing the preamble (PRE) signal. One or a series of TTIs containing ACK/NACK signals may be further succeeded by a TTI containing the postamble (POST) signal. Thus, in any TTI, one of these six signals may be sent. The nonlinear code set for a two MIMO stream system has a nonlinear code set property of $C_{10,6,6}$ such that there are ten bits per code word, six code words in the nonlinear code set, and a minimum code distance of six between each of the six code words from the remaining ones of the six code words.

In a fifth example implementation, the ARQ message includes one of eight different groups of different combinations of acknowledgment (ACK) and/or negative acknowledgement (NACK) signals plus a preamble (PRE) and a postamble (POST). One or typically a series of TTIs containing ACK/NACK signals is preceded with a TTI containing the preamble (PRE) signal. One or a series of TTIs containing ACK/NACK signals may be further succeeded by a TTI containing the postamble (POST) signal. Thus, in any TTI, one of these six signals may be sent. The nonlinear code set for a three MIMO stream system has a nonlinear code set property of $C_{10,10,5}$ such that there are ten bits per code word, ten code words in the nonlinear code set, and a minimum code distance of five between each of the ten code words from the remaining ones of the ten code words.

In a sixth example implementation, the ARQ message includes one of four different combinations of acknowledgment (ACK) and/or negative acknowledgement (NACK) signals plus a preamble (PRE) and a postamble (POST). One or typically a series of TTIs containing ACK/NACK signals is preceded with a TTI containing the preamble (PRE) signal. One or a series of TTIs containing ACK/NACK signals may be further succeeded by a TTI containing the postamble (POST) signal. Thus, in any TTI, one of these six signals may be sent. The nonlinear code set for a four MIMO stream system has a nonlinear code set property of $C_{16,6,9}$ such that there are sixteen bits per code word, six code words in the nonlinear code set, and a minimum code distance of nine between each of the six code words from the remaining ones of the six code words.

BRIEF DESCRIPTION OF THE DRAWINGS

FIG. 5 is a state diagram for extended ACK/NACK signaling in an example HSDPA radio communications system;

FIG. 6 is a two stream MIMO communication in an example radio communications system;

FIG. 7 illustrates a basic ARQ scenario in the two stream MIMO communication example of FIG. 5;

DETAILED DESCRIPTION

In the following description, for purposes of explanation and non-limitation, specific details are set forth, such as particular nodes, functional entities, techniques, protocols, standards, etc. in order to provide an understanding of the described technology. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), programmable logic arrays, and/or using one or more digital signal processors (DSPs). It will be apparent to one skilled in the art that other embodiments may be practiced apart from the specific details disclosed below.

The goal is to employ an optimal coding scheme for ACK/NACK signaling in a MIMO context as described in the background. There are typically three characteristics that define the properties of a code set or code book including the length of each code word in the code set (i.e., the total number of bits in each code word), the total number of valid code words in the code set, and the minimum Hamming distance between two valid distinct code words in the code set. When two words are compared, the Hamming distance is the number of symbol positions for which the corresponding symbols are different. For example, the Hamming distance between code words 1011101 and 1001001 is 2 because the bit values at two bit positions differ.

Figure 8:
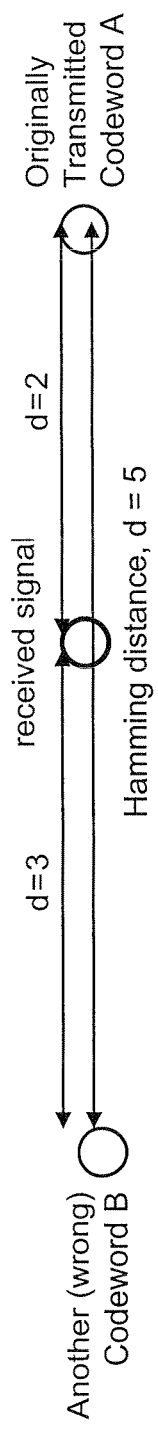
FIG. 8 illustrates a first coding situation with a Hamming distance of five.

FIG. 8 illustrates a first code word set with a Hamming distance of five, meaning that every code word in the code book differs from all the other code words in the book by five symbol or bit values. The originally-transmitted code word A has a Hamming distance of five relative to another code word B in the code set. When the transmitted code word A is received, however, two of the bits are detected as different values from what they were when code word A was transmitted. Fortunately, because the Hamming distance for the code set is five, the received code word has a Hamming distance of two from code word A and a Hamming distance of three from code word B. The receiver chooses the code word with the shortest Hamming distance, which in this case is the correct code word A.

Figure 9:
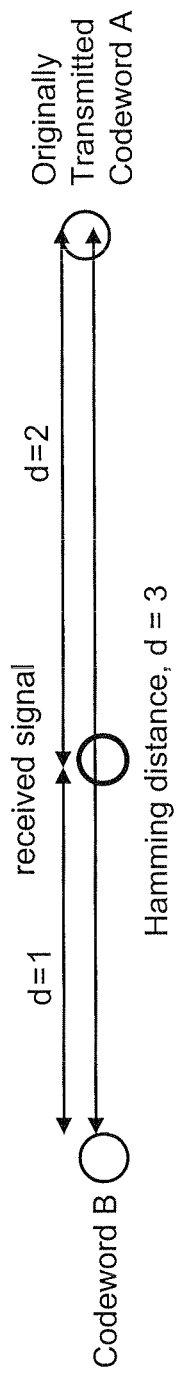
FIG. 9 illustrates a second coding situation with a Hamming distance of three.

But the results are less favorable as the Hamming distance for a code set decreases. For example, FIG. 9 illustrates a second code set with a Hamming distance of three. When the transmitted code word A is received, two of the bits are again detected as different values from what they were when code word A was transmitted. Because the Hamming distance for the code set is only three, the received code word has a Hamming distance of two from code word A. But the received code word has an even shorter Hamming distance of one from the wrong code word B. The receiver chooses code word B since it has the shortest Hamming distance, which in this case is the incorrect code word. So a code book with a longer Hamming distance is desirable.

The inventors discovered an optimal code set for coding an ARQ message. One non-limiting example ARQ message might include ACK and/or NACK signals, one ACK or NACK indicator per MIMO stream, and possibly also a preamble (PRE) and a postamble (POST) for use in various MIMO schemes such as 2-stream, 3-stream, and 4-stream MIMO. One or typically a series of TTIs containing ACK/NACK signals may be preceded with a TTI containing a preamble (PRE) signal. One or a series of TTIs containing ACK/NACK signals may be further succeeded by a TTI containing a postamble (POST) signal. Thus, in any TTI, one of these six signals may be sent.

A preferred, non-limiting example embodiment uses an optimal nonlinear code set where the minimum Hamming distance between all the code words in the code set achieves the Plotkin bound, which is the longest minimum Hamming distance that can ever be achieved. For a 2-stream MIMO case with PRE, POST, and four different possible ACK/NACK combinations, six code words are used. The four different possible combinations of ACK/NACK signals for two MIMO streams include: 1) ACK/ACK, 2) ACK/NACK, 3) NACK/ACK, AND 4) NACK/NACK. One of these ACK/NACK pairs is sent during the transition from the ACK/NACK state back to the ACK/NACK state according to the state diagram in FIG. 5. One ACK or NACK indicator is sent per MIMO stream per transmission time interval. The PRE is sent during the transition from the DTX state to the PRE state and also during the transition from the ACK/NACK state to the PRE state. The POST is sent during the transition from the ACK/NACK state to the DTX state. Each of the six code words in the code book has a length of 10 bits, and the minimum Hamming distance between any pair of the distinct code words is 6. So the code set has a code set property of $C_{10,6,6}$.

More generally, the code set property notation $C_{i,j,k}$ is used where the first subscript i indicates the length of the code (number of encoded bits), the second subscript j indicates the number of code words, and the third subscript k indicates the minimum Hamming distance between any distinct pair of code words in that code set. The discovered code set property $C_{10,6,6}$ is nonlinear because the relationship w=xG can not be used to generate a codeword within a code set having that code set property $C_{10,6,6}$. (Sometimes a nonlinear code set property is simply referred to as a nonlinear code set with the understanding that the set of codes has a particular code set property $C_{i,j,k}$.) Moreover, because the subset of $C_{10,6,6}$ with the four codewords associated with the ACK/NACK operations can not be generated by w=xG, the subset of $C_{10,6,6}$ also has a nonlinear code property.

For a 3-stream MIMO case, the inventors determined that 10 code words should be used based on the eight different possible combinations of ACK/NACK signals for three MIMO streams including: 1) ACK/ACK/ACK, 2) ACK/ACK/NACK, 3) ACK/NACK/ACK, 4) ACK/NACK/NACK, 5) NACK/ACK/ACK, 6) NACK/ACK/NACK, 7) NACK/NACK/ACK, 8) NACK/NACK/NACK. One of these messages is sent during the transition from the ACK/NACK state back to the ACK/NACK state according to the state diagram in FIG. 5. One ACK or NACK indicator is sent per MIMO stream per transmission time interval. The PRE is sent during the transition from the DTX state to the PRE state and also during the transition from the ACK/NACK state to the PRE state. The POST is sent during the transition from the ACK/NACK state to the DTX state. Thus, overall there are 10 messages that can be sent in HS-DPCCH. An optimal nonlinear code set in this case has 10 code words, each of length 10, and the minimum Hamming distance between any pair of the distinct code words is 5. Hence, the optimal nonlinear code set has the nonlinear code set property of $C_{10,10,5}$.

For the 4-stream MIMO case, the inventors determined that 18 code words should be used based on the 16 different possible combinations of ACK/NACK signals or indicators for four MIMO streams in addition to a PRE and a POST. One ACK or NACK indicator is sent per MIMO stream per transmission time interval. Accordingly, there are 18 code words in the code book, each of length 10 bits, and the minimum Hamming distance between any pair of the distinct code words is 4. The optimal code set has the nonlinear code set property of $C_{18,10,4}$.

For a 2-stream MIMO situation, such as the example shown in FIG. 6, an example illustrating how an optimal code set having the nonlinear code set property $C_{10,6,6}$ may be constructed is described. However, the optimal code set is not limited to this particular construction. Instead, any code set that has the code set property $C_{10,6,6}$ may be used. For example, a mask may be used to transform the values of the code words themselves but the masked code set will still have the code set property $C_{10,6,6}$. Also, any permutation of the encoded bits preserves the minimum Hamming distance and thus results in another code set with the same code set property.

It is known that one can derive an optimal code with codeword length less or equal to 12 by starting with a size-12 Hadamard matrix $A_{12}$ 1 1 1 1 1 1 1 1 1 1 1 1
1 0 1 0 1 1 1 0 0 0 1 0
1 0 0 1 0 1 1 1 0 0 0 1
1 1 0 0 1 0 1 1 1 0 0 0

-continued

```
1 0 1 0 0 1 0 1 1 1 0 0
1 0 0 1 0 0 1 0 1 1 1 0
1 0 0 0 1 0 0 1 0 1 1 1
1 1 0 0 0 1 0 0 1 0 1 1
1 1 1 0 0 0 1 0 0 1 0 1
1 1 1 1 0 0 0 1 0 0 1 0
1 0 1 1 1 0 0 0 1 0 0 1
1 1 0 1 1 1 0 0 0 1 0 0
```

A Hadamard matrix is a square matrix whose entries are either 1 or 0 and whose rows are mutually orthogonal, meaning that every two different rows in a Hadamard matrix represent two perpendicular vectors whose cross product is zero. Next, a code of length 11 and a minimum distance of 6 is obtained by deleting the first column of the $A_{12}$ Hadamard matrix to produce the following code set $C_{11,12,6}$:

CW0=[1 1 1 1 1 1 1 1 1 1 1]
CW1=[0 1 0 1 1 1 0 0 0 1 0]
CW2=[0 0 1 0 1 1 1 0 0 0 1]
CW3=[1 0 0 1 0 1 1 1 0 0 0]
CW4=[0 1 0 0 1 0 1 1 1 0 0]
CW5=[0 0 1 0 0 1 0 1 1 1 0]
CW6=[0 0 0 1 0 0 1 0 1 1 1]
CW7=[1 0 0 0 1 0 0 1 0 1 1]
CW8=[1 1 0 0 0 1 0 0 1 0 1]
CW9=[1 1 1 0 0 0 1 0 0 1 0]
CW10=[0 1 1 1 0 0 0 1 0 0 1]
CW11=[1 0 1 1 1 0 0 0 1 0 0]

A column of the code set $C_{11,12,6}$ can be arbitrarily chosen to sort the code words into two subsets: one with 1 at a particular chosen column and the other with 0 at the same chosen column. The two subsets each contain 6 code words. After puncturing the chosen sorting column, either of these subsets can be chosen to form an optimal code of length 10 and minimum distance 6.

For instance, the first column of the $C_{11,12,6}$ code set can be chosen for such sorting. An optimal code set $C_{10,6,6}$ can be obtained from the subset with 1 in the first column. Removing the first column among those $C_{11,12,6}$ codes having a 1 in the first column, (CW0, CW3, CW7, CW8, CW09, and CW11), produces six codewords renumbered as:

CW0=[1 1 1 1 1 1 1 1 1 1]
CW1=[0 0 1 0 1 1 1 0 0 0]
CW2=[0 0 0 1 0 0 1 0 1 1]
CW3=[1 0 0 0 1 0 0 1 0 1]
CW4=[1 1 0 0 0 1 0 0 1 0]
CW5=[0 1 1 1 0 0 0 1 0 0]

These six codewords can be used to represent the six possible HS-DPCCH messages as shown in Table 2. Note that the subcode containing the ACK/NACK indicators is a nonlinear code.

TABLE 2

| Response to $1^{st}$ block | Response to $2^{nd}$ block | HARQ-ACK msg | | | | | | | | | |
|---|---|---|---|---|---|---|---|---|---|---|---|
| | | $w_0$ | $w_1$ | $w_2$ | $w_3$ | $w_4$ | $w_5$ | $w_6$ | $w_7$ | $w_8$ | $w_9$ |
| ACK | ACK | 1 | 1 | 1 | 1 | 1 | 1 | 1 | 1 | 1 | 1 |
| ACK | NACK | 0 | 0 | 1 | 0 | 1 | 1 | 1 | 0 | 0 | 0 |
| NACK | ACK | 0 | 0 | 0 | 1 | 0 | 0 | 1 | 0 | 1 | 1 |

TABLE 2-continued

| Response to $1^{st}$ block | Response to $2^{nd}$ block | HARQ-ACK msg | | | | | | | | | |
|---|---|---|---|---|---|---|---|---|---|---|---|
| | | $w_0$ | $w_1$ | $w_2$ | $w_3$ | $w_4$ | $w_5$ | $w_6$ | $w_7$ | $w_8$ | $w_9$ |
| NACK | NACK | 1 | 0 | 0 | 0 | 1 | 0 | 0 | 1 | 0 | 1 |
| PRE/POST indication | | | | | | | | | | | |
| PRE | | 1 | 1 | 0 | 0 | 0 | 1 | 0 | 0 | 1 | 0 |
| POST | | 0 | 1 | 1 | 1 | 0 | 0 | 0 | 1 | 0 | 0 |

The minimum or Hamming distance between any signals is six. The Hadamard transform, a generalized class of Fourier transforms, is one non-limiting example of a transform that can be employed in a receiver to decode the code words in this code set having the code set property $C_{10,6,6}$.

As mentioned above, the code set may be masked, permuted, or otherwise transformed without changing the underlying code set property $C_{10,6,6}$. For example, a code set which differs from the code set shown in Table 2 by a mask and a permutation but that also has the same nonlinear code set property $C_{10,6,6}$ for the six different code words sent over the HS-DPCCH is set forth in Table 3:

TABLE 3

| Response to $1^{st}$ block | Response to $2^{nd}$ block | HARQ-ACK msg | | | | | | | | | |
|---|---|---|---|---|---|---|---|---|---|---|---|
| | | $w_0$ | $w_1$ | $w_2$ | $w_3$ | $w_4$ | $w_5$ | $w_6$ | $w_7$ | $w_8$ | $w_9$ |
| ACK | ACK | 1 | 0 | 1 | 0 | 1 | 1 | 1 | 1 | 0 | 1 |
| ACK | NACK | 1 | 1 | 0 | 1 | 0 | 1 | 0 | 1 | 1 | 1 |
| NACK | ACK | 0 | 1 | 1 | 1 | 1 | 0 | 1 | 0 | 1 | 1 |
| NACK | NACK | 1 | 0 | 0 | 1 | 0 | 0 | 1 | 0 | 0 | 0 |
| PRE/POST indication | | | | | | | | | | | |
| PRE | | 0 | 0 | 1 | 0 | 0 | 1 | 0 | 0 | 1 | 0 |
| POST | | 0 | 1 | 0 | 0 | 1 | 0 | 0 | 1 | 0 | 0 |

If the system resource configuration changes in future evolution of the system specification, code words of different lengths might be needed. The technology described here may be extended to constructing code words of different lengths. For instance, a construction of an optimal nonlinear code set $C_{16,6,9}$ of length 16 and minimum distance 9 is demonstrated in the following. Starting from the optimal code set $C_{10,6,6}$ given above, six more columns are added to the code set. Four additional columns can be repeats of the $1^{st}$, $4^{th}$, $8^{th}$ and $9^{th}$ columns from $C_{10,6,6}$. Two more columns include four consecutive ones and two consecutive zeros. The result for this example for the code words in optimal $C_{16,6,9}$ code set are:

CW0=[1 1 1 1 1 1 1 1 1 1 1 1 1 1 1 0]
CW1=[0 0 1 0 1 1 1 0 0 0 0 0 0 0 1 0]
CW2=[0 0 0 1 0 0 1 0 1 1 0 1 0 1 1 1]
CW3=[1 0 0 0 1 0 0 1 0 1 1 1 0 1 0 1 1]
CW4=[1 1 0 0 0 1 0 0 1 0 1 0 0 1 0 1]
CW5=[0 1 1 1 0 0 0 1 0 0 0 1 1 0 0 1]

For 3-stream MIMO, $2^3+2=10$ codewords are needed. Again, start with a size-12 Hadamard matrix $A_{12}$:

```
1 1 1 1 1 1 1 1 1 1 1 1
1 0 1 0 1 1 1 0 0 0 1 0
1 0 0 1 0 1 1 1 0 0 0 1
1 1 0 0 1 0 1 1 1 0 0 0
```

-continued
1 0 1 0 0 1 0 1 1 1 0 0

1 0 0 1 0 0 1 0 1 1 1 0

1 0 0 0 1 0 0 1 0 1 1 1

1 1 0 0 0 1 0 0 1 0 1 1

1 1 1 0 0 0 1 0 0 1 0 1

1 1 1 1 0 0 0 1 0 0 1 0

1 0 1 1 1 0 0 0 1 0 0 1

1 1 0 1 1 1 0 0 0 1 0 0

Next, an optimal nonlinear code set $C_{11,12,6}$ of length 11 and minimum distance 6 is obtained by deleting the $1^{st}$ column:
CW0=[1 1 1 1 1 1 1 1 1 1 1]
CW1=[0 1 0 1 1 1 0 0 0 1 0]
CW2=[0 0 1 0 1 1 1 0 0 0 1]
CW3=[1 0 0 1 0 1 1 1 0 0 0]
CW4=[0 1 0 0 1 0 1 1 1 0 0]
CW5=[0 0 1 0 0 1 0 1 1 1 0]
CW6=[0 0 0 1 0 0 1 0 1 1 1]
CW7=[1 0 0 0 1 0 0 1 0 1 1]
CW8=[1 1 0 0 0 1 0 0 1 0 1]
CW9=[1 1 1 0 0 0 1 0 0 1 0]
CW10=[0 1 1 1 0 0 0 1 0 0 1]
CW11=[1 0 1 1 1 0 0 0 1 0 0]

The code set $C_{11,12,6}$ can be punctured again to give an optimal code of length 10 and minimum distance 6. This can be accomplished by deleting any column from the above list. For instance, puncturing the first bit from $C_{11,12,6}$ gives the following code set $C_{10,12,5}$:
CW0=[1 1 1 1 1 1 1 1 1 1]
CW1=[1 0 1 1 1 0 0 0 1 0]
CW2=[0 1 0 1 1 1 0 0 0 1]
CW3=[0 0 1 0 1 1 1 0 0 0]
CW4=[1 0 0 1 0 1 1 1 0 0]
CW5=[0 1 0 0 1 0 1 1 1 0]
CW6=[0 0 1 0 0 1 0 1 1 1]
CW7=[0 0 0 1 0 0 1 0 1 1]
CW8=[1 0 0 0 1 0 0 1 0 1]
CW9=[1 1 0 0 0 1 0 0 1 0]
CW10=[1 1 1 0 0 0 1 0 0 1]
CW11=[0 1 1 1 0 0 0 1 0 0]

To encode the 10 signals required for 3-stream MIMO, 10 code words can be arbitrarily chosen from these 12 code words. The minimum or Hamming distance between any HS-DPCCH messages is at least 5. The subcode containing the 8 combinations of ACK/NACK indicators is a nonlinear code. Again, the Hadamard transform can be employed in a receiver for decoding this code. The nonlinear code set property $C_{10,12,5}$ may be implemented using different code words, as explained above, as long as they have the nonlinear code set property of $C_{10,12,5}$.

For 4-stream MIMO, $2^4+2=18$ codewords are needed. An optimal code set having code words of length 9 and minimum distance of 4 contains 20 code words. This code set may be constructed in one non-limiting example from a size 10 conference matrix. A conference matrix (also called a C-matrix) is a square matrix C with 0 on the diagonal and 1 and 0 off the diagonal, such that $C^T C$ is a multiple of the identity matrix I. These codewords is given in the following:
$C_{9,20,4}$
CW0=[0 0 0 0 0 0 0 0 0]
CW1=[1 1 1 0 0 1 0 1 0]
CW2=[1 1 1 1 0 0 0 0 1]
CW3=[1 1 1 0 1 0 1 0 0]
CW4=[0 1 0 1 1 1 0 0 1]
CW5=[0 0 1 1 1 1 1 0 0]
CW6=[1 0 0 1 1 1 0 1 0]
CW7=[0 0 1 0 1 0 1 1 1]
CW8=[1 0 0 0 0 1 1 1 1]
CW9=[0 1 0 1 0 0 1 1 1]
CW10=[1 0 0 1 1 0 1 0 1]
CW11=[0 1 0 0 1 1 1 1 0]
CW12=[0 0 1 1 0 1 0 1 1]
CW13=[1 0 1 1 0 0 1 1 0]
CW14=[1 1 0 0 1 0 0 1 1]
CW15=[0 1 1 0 0 1 1 0 1]
CW16=[1 1 0 1 0 1 1 0 0]
CW17=[0 1 1 1 1 0 0 1 0]
CW18=[1 0 1 0 1 1 0 0 1]
CW19=[1 1 1 1 1 1 1 1 1]

An example nonlinear code set for the 18 HS-DPCCH messages can be constructed as follows. First, a "1" is appended to code words CW0 and CW19. Secondly, two code words from code words CW1, CW2, . . . , CW18 are arbitrarily discarded and the remaining 16 codewords are appended with a "0." For instance, if code words CW17 and CW18 from $C_{9,20,4}$ are discarded, an optimal nonlinear code set for the 18 HS-DPCCH messages in this 4-stream MIMO situation is given by:
$C_{10,18,4}$
CW0=[0 0 0 0 0 0 0 0 0 1]
CW1=[1 1 1 0 0 1 0 1 0 0]
CW2=[1 1 1 1 0 0 0 0 1 0]
CW3=[1 1 1 0 1 0 1 0 0 0]
CW4=[0 1 0 1 1 1 0 0 1 0]
CW5=[0 0 1 1 1 1 1 0 0 0]
CW6=[1 0 0 1 1 1 0 1 0 0]
CW7=[0 0 1 0 1 0 1 1 1 0]
CW8=[1 0 0 0 0 1 1 1 1 0]
CW9=[0 1 0 1 0 0 1 1 1 0]
CW10=[1 0 0 1 1 0 1 0 1 0]
CW11=[0 1 0 0 1 1 1 1 0 0]
CW12=[0 0 1 1 0 1 0 1 1 0]
CW13=[1 0 1 1 0 0 1 1 0 0]
CW14=[1 1 0 0 1 0 0 1 1 0]
CW15=[0 1 1 0 0 1 1 0 1 0]
CW16=[1 1 0 1 0 1 1 0 0 0]
CW19=[1 1 1 1 1 1 1 1 1 1]

Even though the minimum distance of this code is 4, the code word CW0 has a distance of at least 6 from any of the other code words in the set, and the code word CW19 has a distance of at least 5 from any of the other code words in the set. It may be useful to assign CW0 to represent the POST signal and CW19 to represent the PRE signal. The other 16 code words in the nonlinear code set can be used to represent the different combinations of ACK/NACK of the four individual streams. In any case, choosing 16 codewords from the above to convey the ACK/NACK results in a subcode that is nonlinear.

Figure 10:
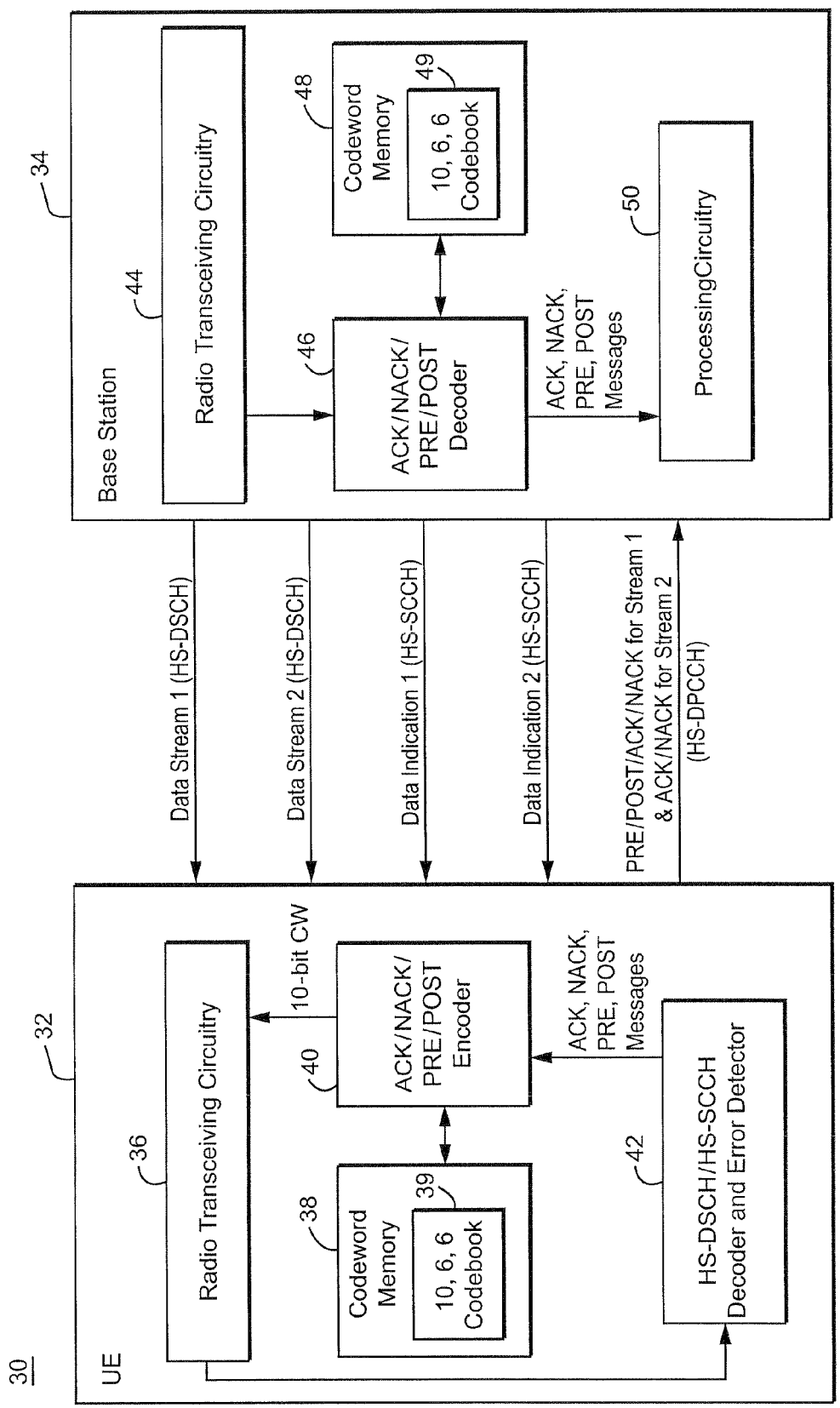
FIG. 10 is simplified function block diagram of a non-limiting example two stream MIMO radio communication using a 10, 6, 6 nonlinear code set for error protecting ACK/NACK/PRE/POST messages in an example HSDPA radio communications system.

FIG. 10 is simplified function block diagram of a non-limiting example 2-stream MIMO radio communication using a 10, 6, 6 nonlinear code set for error protecting ACK/NACK/PRE/POST signals in an example HSDPA radio communications system 30. The UE 32 includes radio transceiving circuitry 36 coupled to an ACK/NACK/PRE/POST encoder 40 and to an HS-DSCH/HS-SCCH decoder and error detector/corrector 42. The encoder 40 is coupled to a code word memory 38, which in this example stores a code book 39 having a nonlinear code set property of $C_{10,6,6}$. The base station 34 includes radio transceiving circuitry 44 coupled to an ACK/NACK/PRE/POST decoder 46. The decoder 46 is coupled to a code word memory 48, which in this example also stores a code book 49 having a nonlinear code set property of $C_{10,6,6}$. The decoder is coupled to processing circuitry 50.

Figure 1:
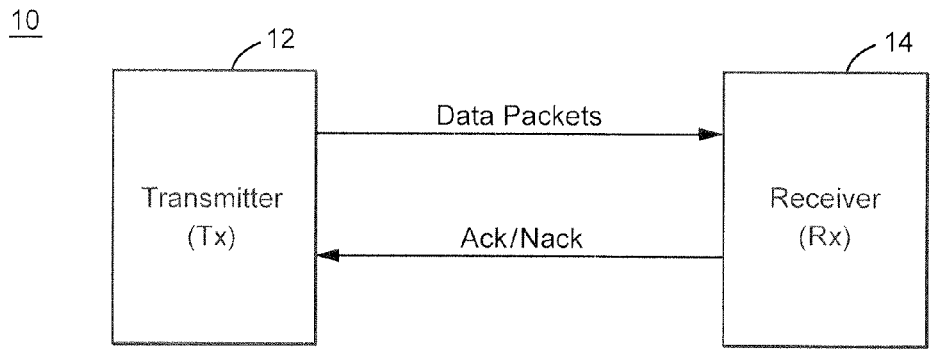
FIG. 1 is an example data communications system that employs an ARQ protocol.
Figure 2:
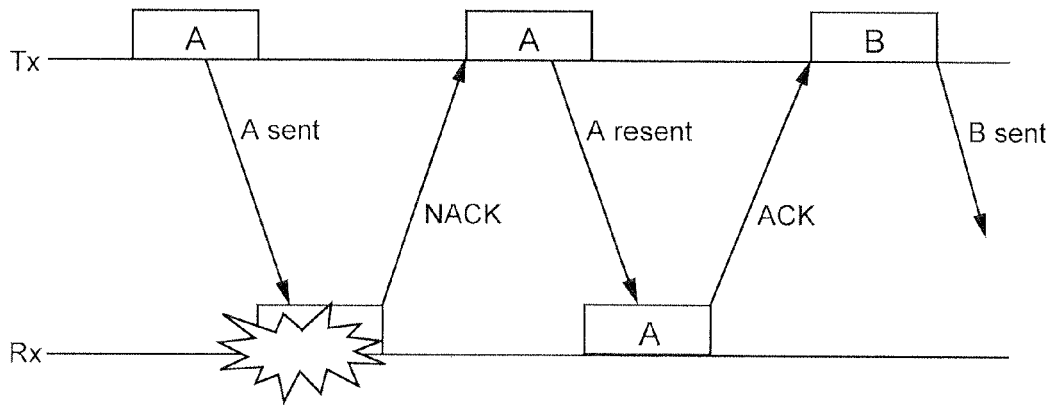
FIG. 2 illustrates a basic ARQ scenario.
Figure 3:
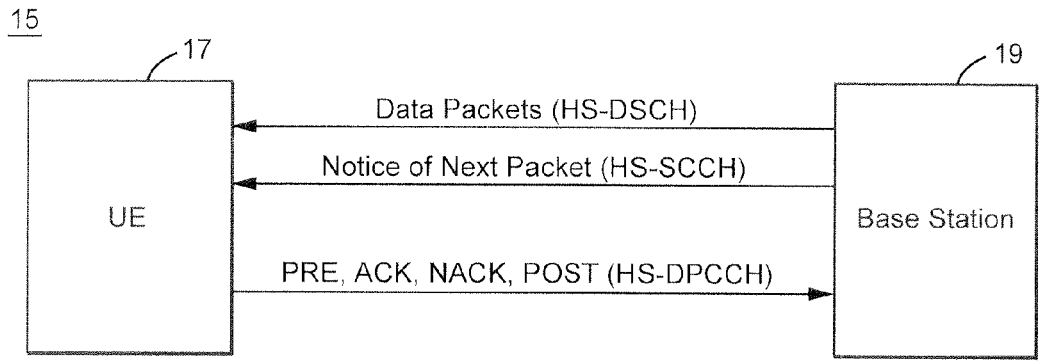
FIG. 3 is a simplified example HSDPA radio communications system.
Figure 4:
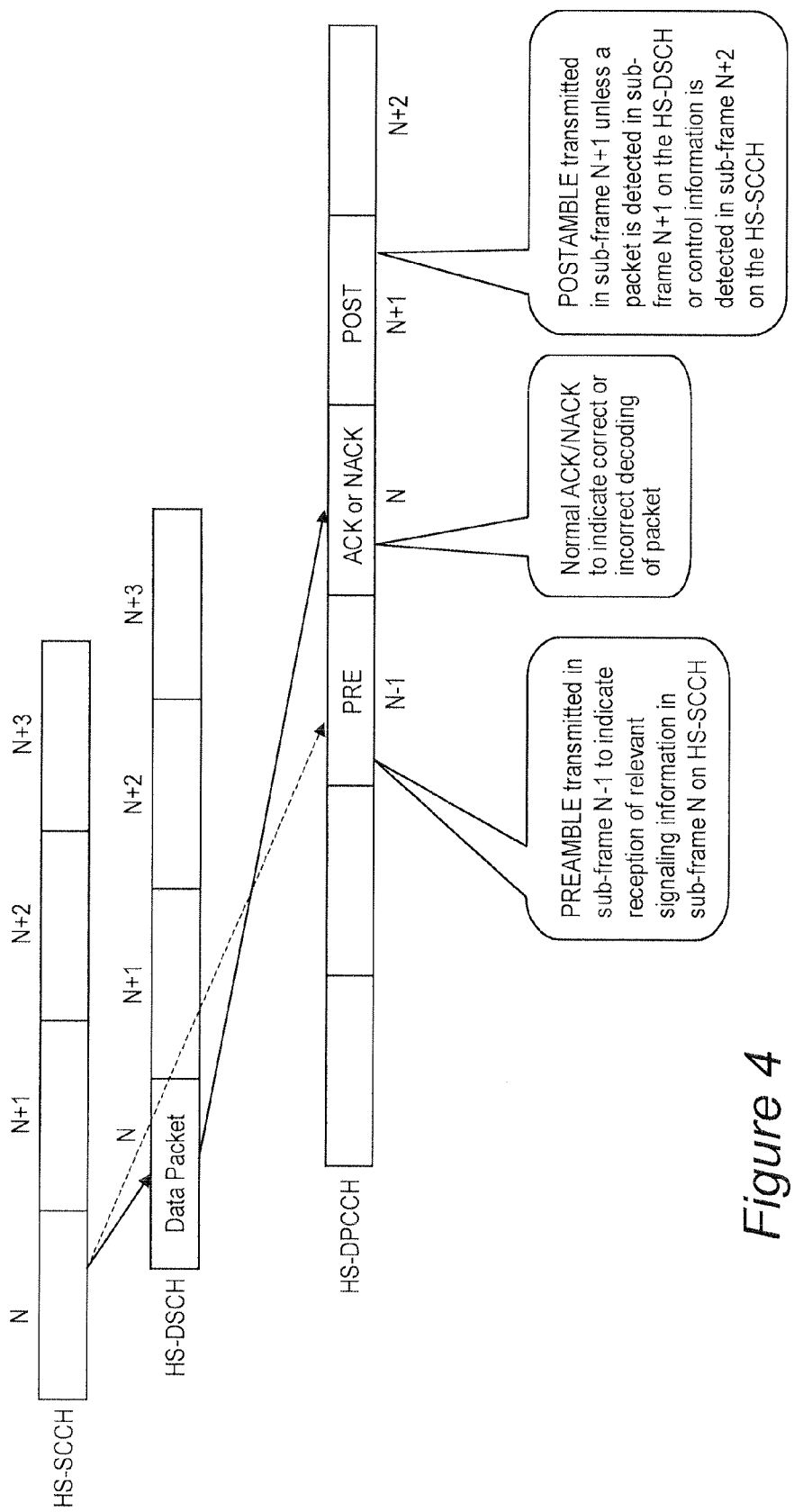
FIG. 4 is a diagram that illustrates an example timing for communications between a base station and a user equipment in the system of FIG. 3 over the HS-SCCH, HS-DSCH, and HS-DPCCH.

The base station 34 sends two data streams 1 and 2 over the HS-DSCH to the UE 32. As described above in conjunction with FIG. 4, it also sends a corresponding data transmission indication message that is shared by both data streams to the UE 32 to alert the UE of the packets that will soon be transmitted. The radio transceiving circuitry 36 in the UE provides received data indicator and packets corresponding to the two streams to the HS-DSCH/HS-SCCH decoder and error detector/corrector 42, which after decoding, generates appropriate ACK/NACK/PRE/POST signals. The ACK/NACK/PRE/POST encoder 40 encodes those ACK/NACK/PRE/POST signals using code words obtained from the 10,6,6 codebook 39 stored in the codeword memory 38. Each 10-bit code word is then provided to the radio transceiving circuitry 36 for transmission back to the base station 34 over the HS-DPCCH.

The base station 34 receives the ACK/NACK/PRE/POST code words in its radio transceiving circuitry 44 which provides demodulated code words to the ACK/NACK/PRE/POST decoder 46. The decoder 46 decodes the code words using the code book 49 which, like the codebook 39, has a nonlinear code set property of $C_{10,6,6}$. The decoded ACK/NACK/PRE/POST signals are provided to the processing circuitry 50 to determine whether to retransmit a packet or not.

The inventors discovered an optimal nonlinear code set for coding two, three, or four information bits, an example of which are the ACK/NACK bits, in various MIMO schemes such as 2-stream, 3-stream, and 4-stream MIMO. The optimal nonlinear code set for the 2-stream case is $C_{10,4,6}$ which can be constructed using the same procedure as in the six signals (4 ACK or NACK indicators, a PRE, and a POST), 2-stream case described above and then selecting four of the six possible code words. Basically, the $C_{10,4,6}$ code is a subcode of $C_{10,6,6}$. A subcode of a code set A is formed by selecting a subset of codewords from code set A. The optimal nonlinear code set for sending three ACK/NACK bits for the 3-stream case is $C_{10,8,5}$ which can be constructed using the subcode of the aforementioned code set $C_{10,10,5}$. The optimal nonlinear code set for sending four ACK/NACK bits for the 4-stream case is $C_{10,16,4}$ which can be constructed using the subcode of the aforementioned code set $C_{10,18,4}$. All these subcodes are nonlinear codes.

Figure 11:
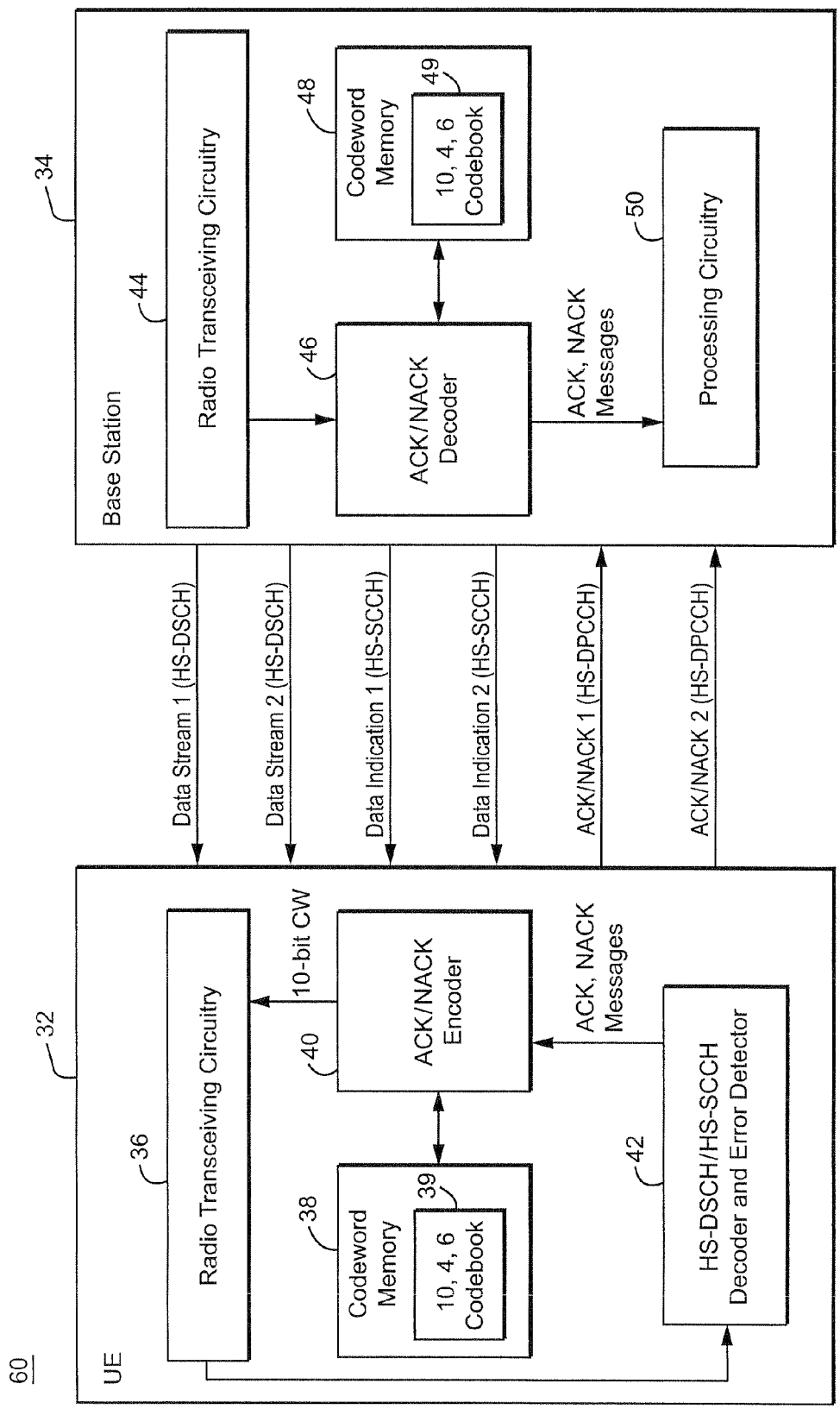
FIG. 11 is simplified function block diagram of a non-limiting example two stream MIMO radio communication using a 10, 4, 6 nonlinear code set for error protecting ACK/NACK messages in an example HSDPA radio communications system.

FIG. 11 is simplified function block diagram of a non-limiting example two stream MIMO radio communication using a 10, 4, 6 nonlinear code set for error protecting ARQ messages in an example HSDPA radio communications system 60. FIG. 11 differs from FIG. 10 in that only four messages corresponding to two ACK/NACK bits are encoded/decoded and that an optimal nonlinear code set $C_{10,4,6}$ is used in codework memory to perform that encoding and decoding. In general, K ACK/NACK bits may be encoded/decoded using a nonlinear code of $2^K$ codewords.

The technology described above solves the technical problems described in the background. The optimal nonlinear code sets described above for different numbers of messages, e.g., the combination of ACK/NACK bits for multiple stream MIMO with or without PRE and POST signals, provide significantly greater performance as compared to simple repetition codes and to codes with shorter Hamming distances.

Although various embodiments have been shown and described in detail, the claims are not limited to any particular embodiment or example. For example, although primarily described in terms of 2-stream, 3-stream, and 4-stream MIMO and for the combination of ACK/NACK bits with or without PRE and POST signals, other optimal nonlinear code sets may be constructed for any larger number of MIMO streams, and different types of messages.

None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. An error protection method for use in a multiple input multiple output (MIMO) radio communications system, comprising:
   receiving two or more MIMO data streams transmitted over a radio interface, each MIMO data stream containing data units;
   generating an automatic repeat request (ARQ) message for one or more data units received for each MIMO data stream; and
   coding the ARQ message using a code word from a nonlinear code set, wherein any linear combination of code words in the nonlinear code set is not also a member of the nonlinear code set.

2. The method in claim 1, wherein the ARQ message includes the following acknowledgment (ACK) and/or negative acknowledgement (NACK) pairs, with one ACK or NACK indicator being sent per MIMO stream per transmission time interval: ACK/ACK, ACK/NACK, NACK/ACK, and NACK/NACK, and
   wherein the nonlinear code set for a two MIMO stream system has a nonlinear code set property of C.sub.10,4,6 such that there are ten bits per code word, four code words in the nonlinear code set, and a minimum code distance of six between each of the four code words from the remaining ones of the four code words.

3. The method in claim 1, wherein the ARQ message includes the following acknowledgment (ACK) and/or negative acknowledgement (NACK) triplets, with one ACK or NACK indicator being sent per MIMO stream per transmission time interval: ACK/ACK/ACK, ACK/ACK/NACK, ACK/NACK/ACK, ACK/NACK/NACK, NACK/ACK/ACK, NACK/ACK/NACK, NACK/NACK/ACK, and NACK/NACK/NACK, and
   wherein the nonlinear code set for a three MIMO stream system has a nonlinear code set property of C.sub.10,8,5 such that there are ten bits per code word, eight code words in the nonlinear code set, and a minimum code distance of five between each of the eight code words from the remaining ones of the eight code words.

4. The method in claim 1, wherein the ARQ message includes sixteen different combinations of four ARQ signals having one or both of an acknowledgment (ACK) signal and a negative acknowledgement (NACK) signal, with one ACK or NACK indicator being sent per MIMO stream per transmission time interval, and wherein the nonlinear code set for a four MIMO stream system has a nonlinear code set property of C.sub.10, 16,4 such that there are ten bits per code word, sixteen code words in the nonlinear code set, and a minimum code distance of four between each of the sixteen code words from the remaining ones of the sixteen code words.

5. The method in claim 1, wherein the radio communications system is a High Speed Downlink Packet Access (HSDPA) system and the method is implemented in a mobile radio station or in a radio base station.

6. The method in claim 1, wherein the ARQ message includes four different combinations of acknowledgment (ACK) and/or negative acknowledgement (NACK) signals plus a preamble (PRE) and a postamble (POST), wherein one or more transmission time intervals (TTIs) containing ACK/NACK signals are preceded with a TTI containing the preamble (PRE) signal and succeeded by a TTI containing the postamble (POST) signal, and wherein the nonlinear code set for a two MIMO stream system has a nonlinear code set property of C.sub.10,6,6 such that there are ten bits per code word, six code words in the nonlinear code set, and a minimum code distance of six between each of the six code words from the remaining ones of the six code words.

7. The method in claim 1, wherein the ARQ message includes eight different groups of different combinations of acknowledgment (ACK) and/or negative acknowledgement (NACK) signals plus the preamble (PRE) and the postamble (POST), wherein one or more transmission time intervals (TTIs) containing ACK/NACK signals are preceded with a TTI containing the preamble (PRE) signal and succeeded by a TTI containing the postamble (POST) signal, and wherein the nonlinear code set for a three MIMO stream system has a nonlinear code set property of C.sub.10, 10,5 such that there are ten bits per code word, ten code words in the nonlinear code set, and a minimum code distance of five between each of the ten code words from the remaining ones of the ten code words.

8. The method in claim 1, wherein the ARQ message includes four different combinations of acknowledgment (ACK) and/or negative acknowledgement (NACK) signals plus a preamble (PRE) and a postamble (POST), wherein one or more transmission time intervals (TTIs) containing ACK/NACK signals are preceded with a TTI containing the preamble (PRE) signal and succeeded by a TTI containing the postamble (POST) signal, and wherein the nonlinear code set for a two MIMO stream system has a nonlinear code set property of C.sub.16,6,9 such that there are sixteen bits per code word, six code words in the nonlinear code set, and a minimum code distance of nine between each of the six code words from the remaining ones of the six code words.

9. An error protection method for use in a multiple input multiple output (MIMO) radio communications system, comprising:

transmitting in transmission time intervals one or more data units from two or more MIMO data streams transmitted over a radio interface;

receiving an automatic repeat request (ARQ) message for one or more data units received for each MIMO data stream for each transmission time interval; and decoding the ARQ message using a code word from a nonlinear code set, wherein any linear combination of code words in the nonlinear code set is not also a member of the nonlinear code set.

10. The method in claim 9, wherein the radio communications system is a High Speed Downlink Packet Access (HSDPA) system and the method is implemented in a mobile radio station or in a radio base station.

11. The method in claim 9, wherein the ARQ message includes one of the following acknowledgment (ACK)/negative acknowledgement (NACK) pairs, with one ACK or NACK indicator being sent per MIMO stream per transmission time interval: ACK/ACK, ACK/NACK, NACK/ACK, and NACK/NACK, and wherein the nonlinear code set for a two MIMO stream system has a nonlinear code set property of C.sub.10,4,6 such that there are ten bits per code word, four code words in the nonlinear code set, and a minimum code distance of six between each of the four code words from the remaining ones of the four code words.

12. The method in claim 9, wherein the ARQ message includes one of four different combinations of acknowledgment (ACK) and/or negative acknowledgement (NACK) signals plus a preamble (PRE) or a postamble (POST), and wherein the nonlinear code set for a two MIMO stream system has a nonlinear code set property of C.sub.10,6,6 such that there are ten bits per code word, six code words in the nonlinear code set, and a minimum code distance of six between each of the four code words from the remaining ones of the four code words.

13. An error protection apparatus for use in a multiple input multiple output (MIMO) radio communications system, comprising:

a radio receiver for receiving two or more MIMO data streams transmitted over a radio interface, each MIMO data stream containing data packets;

a decoder for decoding the received MIMO data streams and generating an automatic repeat request (ARQ) message associated with one or more data units received for each MIMO data stream; and an encoder for coding the ARQ message using a code word from a nonlinear code set, wherein any linear combination of code words in the nonlinear code set is not also a member of the nonlinear code set.

14. The apparatus in claim 13, wherein the ARQ messages includes the following acknowledgment (ACK) and/or negative acknowledgement (NACK) pairs, with one ACK or NACK indicator being sent per MIMO stream per transmission time interval: ACK/ACK, ACK/NACK, NACK/ACK, and NACK/NACK, and wherein the nonlinear code set for a two MIMO stream system has a nonlinear code set property of C.sub.10,4,6 such that there are ten bits per code word, four code words in the nonlinear code set, and a minimum code distance of six between each of the four code words from the remaining ones of the four code words.

15. The apparatus in claim 13, wherein the ARQ messages includes acknowledgment (ACK) and/or negative acknowledgement (NACK) triplets, with one ACK or NACK indicator being sent per MIMO stream per transmission time interval: ACK/ACK/ACK, ACK/ACK/NACK, ACK/NACK/ACK, ACK/NACK/NACK, NACK/ACK/ACK, NACK/ACK/NACK, NACK/NACK/ACK, and NACK/NACK/NACK, and wherein the nonlinear code set for a three MIMO stream system has a nonlinear code set property of C.sub.10,8,5 such that there are ten bits per code word, eight code words in the nonlinear code set, and a minimum code distance of five between each of the eight code words from the remaining ones of the eight code words.

16. The apparatus in claim 13, wherein the ARQ message includes sixteen different combinations of four ARQ signals having one or both of an acknowledgment (ACK) signal and a negative acknowledgement (NACK) signal, with one ACK or NACK indicator being sent per MIMO stream per transmission time interval,
wherein the nonlinear code set for a four MIMO stream system has a nonlinear code set property of C.sub.10, 16,4 such that there are ten bits per code word, sixteen code words in the nonlinear code set, and a minimum code distance of four between each of the sixteen code words from the remaining ones of the sixteen code words.

17. The apparatus in claim 13, wherein the ARQ message includes acknowledgment (ACK) and/or negative acknowledgement (NACK) signals plus a preamble (PRE) and a postamble (POST),
wherein one or more transmission time intervals (TTIs) containing ACK/NACK signals are preceded with a TTI containing the preamble (PRE) signal and succeeded by a TTI containing the postamble (POST) signal, and
wherein the nonlinear code set for a two MIMO stream system has a nonlinear code set property of C.sub.10,6,6 such that there are ten bits per code word, six code words in the nonlinear code set, and a minimum code distance of six between each of the six code words from the remaining ones of the six code words.

18. The apparatus in claim 13, wherein the ARQ message includes eight different groups of different combinations of acknowledgment (ACK) and/or negative acknowledgement (NACK) signals plus a preamble (PRE) and a postamble (POST),
wherein one or more transmission time intervals (TTIs) containing ACK/NACK signals are preceded with a TTI containing the preamble (PRE) signal and succeeded by a TTI containing the postamble (POST) signal, and
wherein the nonlinear code set for a three MIMO stream system has a nonlinear code set property of C.sub.10, 10,5 such that there are ten bits per code word, ten code words in the nonlinear code set, and a minimum code distance of five between each of the ten code words from the remaining ones of the ten code words.

19. An error protection apparatus for use in a multiple input multiple output (MIMO) radio communications system, comprising:
a transmitter for transmitting in transmission time intervals one or more data units from two or more MIMO data streams transmitted over a radio interface;
a receiver for receiving an automatic repeat request (ARQ) message for one or more data units received for each MIMO data stream for each transmission time interval; and
a decoder for decoding ARQ message using a code word from a nonlinear code set, wherein any linear combination of code words in the nonlinear code set is not also a member of the nonlinear code set.

20. The apparatus in claim 19, wherein the ARQ message includes one of four different combinations of acknowledgment (ACK) and/or negative acknowledgement (NACK) signals plus a preamble (PRE) and a postamble (POST),
wherein one or more transmission time intervals (TTIs) containing ACK/NACK signals are preceded with a TTI containing the preamble (PRE) signal and succeeded by a TTI containing the postamble (POST) signal, and
wherein the nonlinear code set for a two MIMO stream system has a nonlinear code set property of C.sub.10,6,6 such that there are ten bits per code word, six code words in the nonlinear code set, and a minimum code distance of six between each of the four code words from the remaining ones of the four code words.

* * * * *